Patented Dec. 22, 1942

2,305,937

UNITED STATES PATENT OFFICE 2,305,937

REGULATING SYSTEM

Terryl B. Montgomery, Wauwatosa, and John F. Sellers, West Allis, Wis., assignors to Allis-Chalmers Manufacturing Company, Milwaukee, Wis., a corporation of Delaware Application July 29, 1940, Serial No. 348,114

10 Claims. (Cl. 172—239)

This invention relates in general to a control system for regulating a characteristic of a dynamo-electric machine, and relates specifically to an improved method of and means for controlling such characteristic by controlling a second dynamo-electric machine connected in the field circuit of the regulated machine.

In controlling the speed or a terminal electrical characteristic of a dynamo-electric machine, by controlling the field excitation thereof, the time necessary to effect a change of such characteristic is an important element. The accuracy, sensitivity, ruggedness, stability and adaptability of the regulator are also important factors to be considered in obtaining the desired regulation.

In regulators of the prior art, utilizing a magnetically controlled member to vary the current in the field circuit of a dynamo-electric machine regulated for a predetermined terminal electrical characteristic, an increase in sensitivity of the regulator decreases the ruggedness of such regulator. Such regulators have been made faster acting only at the expense of loss in accuracy, stability and ruggedness. Such regulators are not adaptable for compensation due to the changes in speed of the regulated machine.

It is therefore an object of the present invention to provide a means for regulating a dynamo-electric machine which will avoid the above disadvantages.

It is also an object of the present invention to regulate a characteristic of a dynamo-electric machine by controlling a second dynamo electric machine connected in the field circuit thereof.

It is a further object of the present invention to provide a regulator that is quick acting and has a high amplification factor, but which is also rugged and stable.

It is a further object of this invention to provide in a regulator for the field circuit of a dynamo-electric machine, a simple means for greatly amplifying the change in field current necessary to produce the required correction and thereafter automatically cutting off the corrective change in field current prior to the actual change in the regulated characteristic.

It is also an object of the present invention to add to the sensitivity of a regulator of the above type by including an auxiliary control of a highly sensitive type in a manner which will prevent failure of the normal control upon failure of the auxiliary control.

It is a further object of the present invention to provide a control for a dynamo-electric machine connected to a reel for winding or unwinding a strip of material, which includes regulating such dynamo-electric machine by means of a generator of standard design connected in the field circuit of the dynamo-electric machine and by controlling a field circuit of such generator.

Objects and advantages other than those above set forth will be apparent from the following description when read in connection with the accompanying drawing, in which.

Figure 1:
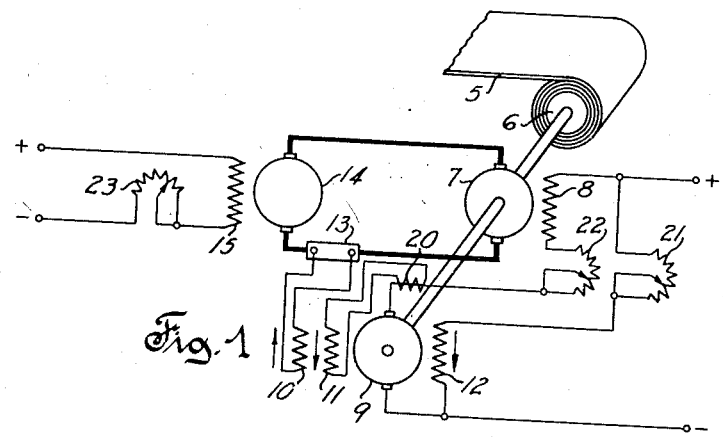
Fig. 1 is a schematic diagram of a control system embodying the present invention.

In each of the three modifications shown in the drawing, a dynamo-electric machine 7, of which it is desired to regulate a terminal electrical characteristic, is shown as mechanically connected to a reel 6 upon which a strip of material 5 may be wound or unwound. If the strip 5 is being wound on the reel 6, the machine 7 is a winding or reel motor. For the purposes of explanation the machine 7 will be considered as a motor and it is shown connected to a supply generator 14. The field 8 of the reel motor 7 is connected in series with an exciter 9 across a source of constant direct current voltage. The voltages of the exciter 9 and the constant direct current source are opposed to each other, with the voltage of the exciter being the lesser. In other words, a decrease in voltage of exciter 9, increases the net voltage across the field 8.

The exciter 9 in Fig. 1 has three fields 10, 11 and 12 which will be designated as the control, cut-off, and main fields, respectively. The main field 12 is the predominant field and is connected across the direct current source so as to produce a voltage at the terminals of the exciter which opposes the voltage of the main source energizing the motor field 8. The control field 10 of the exciter 9 is energized from a shunt 13 in the armature circuit of the reel motor 7 and field 10 is wound differentially with respect to the main field 12. The cut-off field 11 of the exciter 9 is connected across a current transformer 20 and is therefore responsive to the changes in current flowing in the field 8. Cut-off field 11 is also wound differentially with respect to the control field 10, so that a change in current in the circuit of field 8 induces a voltage in transformer 20 such as will oppose or cut off the change being effected by control field 10.

A predetermined speed of the strip 5 may be obtained by adjustment of the rheostat 23 in the field circuit 15 of the generator 14 and by manipulation of the rheostats 21 and 22 in the field circuits of the exciter 9 and reel motor 7, respectively. The exciter 9 is connected mechanically to the shaft of the reel motor 7 and therefore runs at reel motor speed.

The exciter 9 connected as shown in Fig. 1 will maintain a constant current in the reel motor armature circuit and, therefore, a constant tension in strip 5. As the strip 5 builds up on reel 6, the speed of motor 7 is decreased slightly by the strip 5, thereby reducing the C. E. M. F. of motor 7 which increases the armature current thereof. This increase in armature current causes an increase in current through the shunt 13 and therefore an increase in current in the control field 10. This increase in current in field 10 of the exciter 9 decreases the voltage across its terminals as the effect of field 10 is opposed to and less than the effect of main field 12. The decrease in exciter voltage increases the current in the field 8 of the reel motor 7, for the voltage of exciter 9 is opposed to and less than that of the direct current source. The increase in current in the field 8 of the reel motor 7 increases the C. E. M. F. thereof until the motor armature current (and therefore the current in the field 10) returns to its prior predetermined value. The added increment of current in the field 8 necessary to maintain the new reduced value of speed in the motor 7, is obtained by the decrease in speed of the exciter 9 due to the fact that it is direct connected to the reel motor 7.

The cut-off field 11 on the exciter 9 acts to prevent "overshooting" of the regulator. As the field current in field 8 increases due to action of the regulator, a voltage is induced in transformer 20 causing a current in field 11 in a direction to cut off the change. As the current in field 8 assumes a steady state value, no voltage is induced in transformer 20 and field 11 has no effect. This field permits a high amplification of the corrective change and yet prevents hunting and adds to the stability of the regulator.

Figure 2:
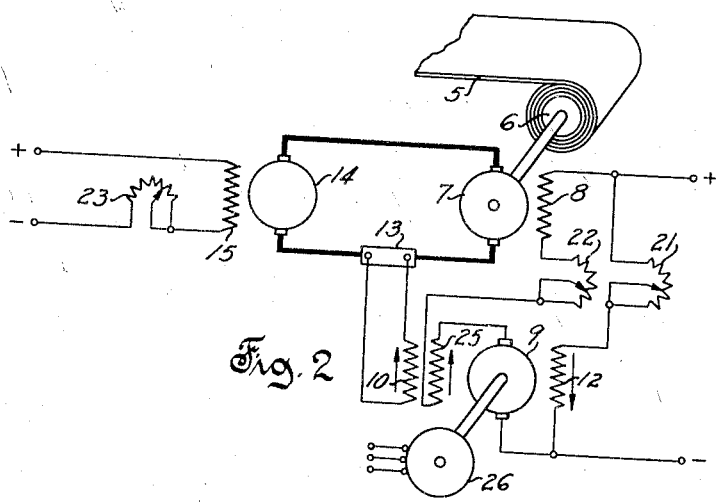
Fig. 2 is a schematic diagram of a modified form of the present invention.

In the modification shown in Fig. 2, exciter 9 is not mechanically connected to the reel motor 7 but is driven separately as shown by a motor 26. The main field 12 of the exciter is the predominant field and is connected to the direct current source so that the voltage of the exciter opposes and is less than that of the direct current source, that is a decrease in the net excitation of the exciter 9 will increase the field current in the field 8. The control field 10 of the exciter 9 is connected differentially with respect to the main field 12. The field 25 in series with the exciter 9 is connected differentially with respect to the main field 12, and acts both as a cut-off field and to amplify the corrective effort of the regulator.

In operation of this modification an increase in current through the shunt 13 will increase the current flowing in field 10 of the exciter 9. This increase in current in field 10 decreases the voltage across the terminals of the exciter 9 which increases the current in the field of the reel motor 7. The increase in excitation of the reel motor 7 increases the C. E. M. F. and decreases the armature current thereof which also decreases the current in the shunt 13 and in the field 10.

The increase in current in the field 8 also increases the current flowing in the field 25 which being differential to the main field 12 decreases the voltage of the exciter 9 to increase the current in the field 8 to that corresponding to the new reduced speed value of the motor 7 due to reel buildup.

The increase in current in the field 8 necessary to bring the regulated condition back to normal, effects a similar increase in current in the field 25 of the exciter 9. This change in current in the field 25 induces a voltage in the field 10 which decreases its effective magnetomotive force in proportion to the rate of change of current in the field 8, that is in proportion to the corrective effort. This action prevents the regulator from overshooting and from hunting although permitting a high amplification factor which forces the field 8 so as to obtain the desired correction in a very short interval of time.

The resistance of the circuit of field 10 is very low. The mutual inductance between fields 10 and 25 is very high and their turn ratio may be such that field 10 has four or five times the number of turns of field 25. Field 12 is a high resistance field with a number of turns of the order of ten times that of field 10. The voltage of the exciter 9 is so related to the constant direct current source that a ten percent change in the current through the shunt 13 will provide a one-hundred percent change in field current through the field 8 at top speed of the motor 7. A hundred percent change in field current of the reel motor 7 would change the motor armature current by ten times.

This means that a ten percent change of current through the shunt 13 provides a regulating effort which if allowed to continue would cause a change in the regulated quantity one-hundred times the change needed. This forcing effect materially reduces the time necessary for the desired change. However, after the corrective change is started the automatic cut-off action of the field 25 through the mutual inductance of fields 25 and 10 and by means of the voltage induced thereby in field 10, cuts off the regulating action. This cut-off action is in proportion to the regulative change required.

This regulator therefore not only has greatly increased sensitivity and greatly increased speed of response, but obtains the former at no loss in ruggedness and obtains the latter at no loss in stability.

Figure 3:
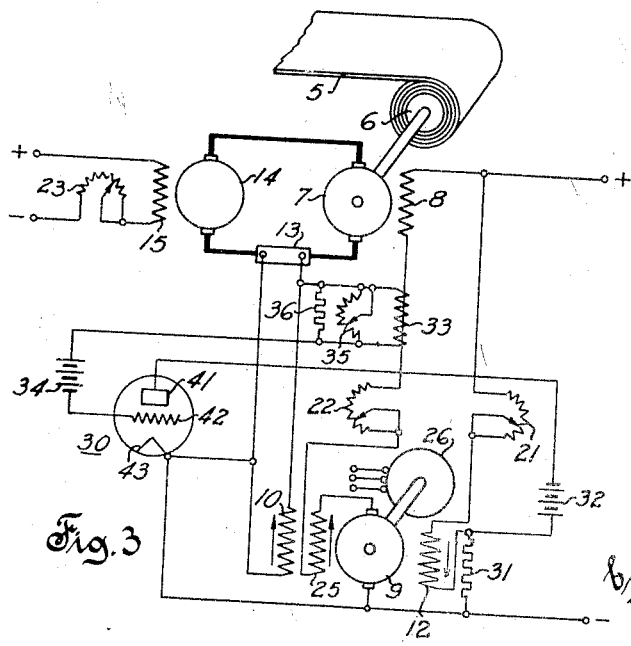
Fig. 3 is a schematic diagram of another modification of the present invention.

The modification shown in Fig. 3 is similar to that shown in Fig. 2 with the addition of an auxiliary amplifier 30. This amplifier is provided in such a manner that it will add to the sensitivity of the regulation of exciter 9 but at the same time if the auxiliary control should fail, it would not affect the normal control by the exciter 9, which is as in Fig. 2.

The auxiliary control comprises the three-electrode tube 30 having electrodes 41 and 43 controlled by a grid 42. The control circuit of the tube 30 is connected across the terminals of the shunt 13, that is, electrode 43 is connected to one side of shunt 13 and the grid 42 is connected to the other side of shunt 13 through battery 34 and resistance 36. Electrodes 41 and 43 are connected in circuit with a battery 32 and a resistance 31, which resistance is in series with the main field 12 of the exciter 9. An increase in voltage across the shunt 13 permits more current to flow in the circuit of the electrodes 41, 43 thereby increasing the voltage drop across resistance 31 and decreasing the effective field current in the field 12 to decrease the voltage of exciter 9 and cause the desired regulating action. The cut-off of this amplified action is provided by a current transformer 33 in circuit with the field 8. Change in the current in the field circuit 8 required for corrective effect induces a voltage in the winding 33 to change the bias on the grid 42 to bring the current through the resistance 31 back to the normal value. This cut-off effect may be varied by means of a rheostat such as 35.

Although the above illustrative embodiments of the invention have been described and shown in conjunction with a motor attached to a reel for winding strip material, the invention is not limited thereto. The exciter (generator) 9 with its three fields 10, 11 and 12 comprises a regulator that may be utilized wherever a magnetic rocking contact sector type, vibratory or other type of regulator is used.

If the magnetic regulators of the prior art were designed so that the corrective effort is just proportional to the disturbing factor, that is, the variation from the normal regulated value, the regulator would be slow in bringing the regulated quantity back to normal. This follows from the fact that as the disturbing factor is reduced, the corrective effort of the regulator is reduced. Therefore, as a particular regulation cycle occurs, the corrective effort of the regulator becomes less and less. Such a regulator is slow but is very stable and does not hunt or overshoot. Such a regulator will balance at only one position of the moving element for a given value of the regulated quantity.

If the regulators of the prior art were designed so that a maximum movement of the regulator moving element obtains, independently of the amount the regulated quantity strays from normal, the regulator is fast acting but will be unstable, that is, it overshoots its mark and will hunt. In other words, if a maximum corrective effort is obtained regardless of the value of the disturbing factor, the moving element will move the entire extent of its range, either plus or minus, and stay there until the corrective change has been made, thus bringing the primary disturbing factor to zero.

Where such a change involves magnetic fields and mechanical changes, a time lag enters, and by the time the regulator can complete its cycle and bring the primary change in the regulated quantity back to normal, the regulator has carried the correction beyond normal, that is, it has overshot. The regulator must therefore hunt back and forth until the normal value is obtained. Also, at the instant normal regulated condition is again effected, the regulator is not in its balanced position, but is in a maximum plus or minus regulating position. During the time necessary for the regulator to move to normal position, the hunting condition is aggravated by the additional corrective effort being applied.

Regulators of this second type have been provided with recall mechanisms comprised of an auxiliary spring held member which tends to physically push the regulator moving member toward its balanced position after a regulating cycle has started. Such mechanical compensations get out of order easily and prevent the regulator from being rugged and simple, and are in need of adjustment and maintenance from time to time. Also such regulators balance in normal operation at the same value of the regulated quantity at various positions of the moving member of the regulator.

The present invention combines the advantages and avoids the disadvantages of both the above types of regulators. It is fast, yet it has no tendency to overshoot. It is stable, yet it is fast. It is sensitive, due to the high amplification factor inherent in the design of its fields, yet it is rugged. It is cheap to manufacture and maintain, for it is not a generator of special design, but is merely a stock generator with additional field windings. There is little about such a regulator to get out of order.

The regulator of this invention may be utilized to maintain a terminal electrical characteristic of any dynamo-electric machine either constant or having a predetermined rising or drooping characteristic or to similarly control any other regulable electrical quantity. When the regulated dynamo-electric machine is a generator rather than a motor, the effect of the self-excited field 25 is necessarily reversed. For a given change in current in the shunt 13, the regulating change in current in the field 8 is in one direction if the machine 7 is a generator and in the opposite direction if the machine 7 is a motor. For example, in Fig. 2 if the dynamo-electric machine 7 is a generator, the current in field 8 must be decreased upon an increase of current in shunt 13, and the self-excited field 25 will be cumulatively wound rather than differentially wound with respect to the field 12.

If the regulator of this invention is used as a voltage regulator, its speed and accuracy of response, make it desirable for use in regulating the voltage of parallel operated generators by controlling the fields thereof with the control fields 10 of the exciters connected responsively to the generator load. To obtain a drooping or rising characteristic, the number of turns on the series field 25 are increased or decreased, respectively.

Although several embodiments of the present invention have been illustrated and described, it will be apparent to those skilled in the art that various changes and modifications may be made therein without departing from the spirit of the invention or from the scope of the appended claims.

It is claimed and desired to secure by Letters Patent:

1. In a control system for maintaining a tension on strip material being wound on or unwound from a reel, a first dynamo-electric machine connected to said reel, a first field winding on said first dynamo-electric machine, a source of excitation current connected to said first field winding, a second dynamo-electric machine the armature of which is connected in circuit with said first field winding in opposition to said excitation source, a first separately excited field winding on said second dynamo-electric machine, a series field winding on said second dynamo-electric machine, a second separately excited field winding on said second dynamo-electric machine connected differentially with respect to said first separately excited field winding and cumulatively with respect to said series field winding, and means for controlling said second separately excited field winding in accordance with the current in the armature circuit of said first dynamo-electric machine.

2. In a control system for maintaining a tension on strip material being wound on or unwound from a reel, a first dynamo-electric machine connected to said reel, a first field winding on said first dynamo-electric machine, a source of excitation current connected to said first field winding, a second dynamo-electric machine the armature of which is mechanically connected to the armature of said first dynamo-electric machine and which is electrically connected in circuit with said first field winding in opposition to said excitation source, a first separately excited field winding on said second dynamo-electric machine, a series field winding on said second dynamo-electric machine, a second separately excited field winding on said second dynamo-electric machine connected differentially with respect to said first separately excited field winding and cumulatively with respect to said series field winding, and means for controlling said second separately excited field winding in accordance with the current in the armature circuit of said first dynamo-electric machine.

3. A control system for regulating an electrical terminal characteristic of a dynamo-electric machine comprising a generator connected in circuit with said dynamo-electric machine so that a change in the output of said generator effects a change in said terminal characteristic, a separately excited first field winding on said generator, a second field winding on said generator connected differentially with respect to said first winding and energized in response to said terminal characteristic of said dynamo-electric machine, a third field winding on said generator connected differentially with respect to said first field winding and energized in response to the output of said generator, and means providing a high mutual inductance between said second field winding and said third field winding.

4. A control system for regulating an electrical terminal characteristic of a dynamo-electric machine comprising a generator, a separately excited first field winding on said generator, a second field winding on said generator differentially related to said first field and provided with effective turns of the order of one-fortieth of the turns on said first field winding and energized in response to said terminal characteristic of said dynamo-electric machine, a third field winding on said generator differentially related to said first winding and provided with effective turns of the order of one-tenth of the turns on said first field, and means whereby said third field winding is mutually inductively related to said second field winding and is responsive to change in output of said generator.

5. A control system for regulating an electrical device comprising a generator, means for connecting said generator so that the output thereof supplies the corrective effort to said device, a field winding on said generator connected responsively to the disturbing factor in a characteristic of said device, means for amplifying the response of said generator to said disturbing factor, and means for cutting off the response of said generator in proportion to the corrective effort effected.

6. A control system for regulating an electrical device comprising a generator, means for connecting said generator so that the output thereof supplies the corrective effort to said device, a field winding on said generator connected responsively to the disturbing factor in a characteristic of said device, means for amplifying the response of said generator to said disturbing factor, and means for cutting off the response of said generator in proportion to the corrective effort effected, said last said means comprising a second field winding on said generator mutually inductively related to said field winding.

7. A control system for regulating an electrical device comprising a generator, means for connecting said generator so that the output thereof supplies the corrective effort to said device, a field winding on said generator connected responsively to the disturbing factor in a characteristic of said device, means for amplifying the response of said generator to said disturbing factor, and means for cutting off the response of said generator in proportion to the corrective effort effected, said last said means comprising a second field winding on said generator mutually inductively related to said field winding and provided with turns of a number substantially less than the number of turns on said field winding.

8. A control system for regulating an electrical terminal characteristic of a dynamo-electric machine comprising a generator connected in circuit with said dynamo-electric machine so that a change in the output of said generator effects a change in said terminal characteristic, a separately excited first field winding on said generator, a second field winding on said generator connected differentially with respect to said first field winding and energized in response to said terminal characteristic of said dynamo-electric machine, a third field winding on said generator connected differentially with respect to said first field winding and energized in response to the output of said generator, and means for varying the effective energization of said first field winding in accordance with the amount of change in said terminal characteristic of said dynamo-electric machine.

9. A control system for regulating an electrical terminal characteristic of a dynamo-electric machine comprising a generator connected in circuit with said dynamo-electric machine so that a change in the output of said generator effects a change in said terminal characteristic, a separately excited first field winding on said generator, a second field winding on said generator connected differentially with respect to said first field winding and energized in response to said terminal characteristic of said dynamo-electric machine, a third field winding on said generator connected differentially with respect to said first field winding and energized in response to the output of said generator, means for varying the effective energization of said first field winding in accordance with the amount of change in said terminal characteristic of said dynamo-electric machine, and means for eliminating the change in excitation of said generator effected by said first field winding energization varying means, said eliminating means being operative in response to a change in output of said generator.

10. A control system for regulating an electrical terminal characteristic of a dynamo-electric machine comprising a generator connected in circuit with said dynamo-electric machine so that a change in the output of said generator effects a change in said terminal characteristic, a separately excited first field winding on said generator, a second field winding on said generator connected differentially with respect to said first winding and energized in response to said terminal characteristic of said dynamo-electric machine, a third field winding on said generator energized in response to the output of said generator, and means providing a high mutual inductance between said second field winding and said third field winding.

TERRYL B. MONTGOMERY.
JOHN F. SELLERS.